United States Patent
Haberland et al.

(10) Patent No.: US 9,176,228 B2
(45) Date of Patent: Nov. 3, 2015

(54) DRIVER ASSISTANCE DEVICE FOR A VEHICLE AND METHOD FOR OPERATING A RADAR DEVICE

(75) Inventors: Udo Haberland, Holzgerlingen (DE); Urs Luebbert, Bietigheim-Bissingen (DE); Uwe Papziner, Bietigheim-Bissingen (DE); Frank Sickinger, Weissach (DE)

(73) Assignee: Valeo Schalter Und Sensoren GmbH, Bietigheim-Bissingen (DE)

( * ) Notice: Subject to any disclaimer, the term of this patent is extended or adjusted under 35 U.S.C. 154(b) by 256 days.

(21) Appl. No.: 13/636,220
(22) PCT Filed: Mar. 21, 2011
(86) PCT No.: PCT/EP2011/054195
§ 371 (c)(1), (2), (4) Date: Nov. 8, 2012
(87) PCT Pub. No.: WO2011/117173
PCT Pub. Date: Sep. 29, 2011

(65) Prior Publication Data
US 2013/0057427 A1 Mar. 7, 2013

(30) Foreign Application Priority Data
Mar. 24, 2010 (DE) .......................... 10 2010 012 624

(51) Int. Cl.
*G01S 7/40* (2006.01)
*G01S 13/93* (2006.01)
(Continued)

(52) U.S. Cl.
CPC ............... *G01S 13/931* (2013.01); *G01S 7/285* (2013.01); *G01S 7/4021* (2013.01); *G01S 7/032* (2013.01);
(Continued)

(58) Field of Classification Search
CPC .......... G01S 2013/9375; G01S 7/4056; G01S 2007/4069; G01S 2013/9314; G01S 2013/9321
USPC ............................... 342/21, 70, 165, 173, 174
See application file for complete search history.

(56) References Cited

U.S. PATENT DOCUMENTS 4,656,480 A * 4/1987 Allezard et al. .............. 342/151
5,315,304 A 5/1994 Ghaleb et al.
(Continued)

FOREIGN PATENT DOCUMENTS

JP 04-309878 11/1992
JP 2004-251837 9/2004
(Continued)

OTHER PUBLICATIONS

International Search Report of the ISA for PCT/EP2011/054195 dated Jun. 24, 2011.
(Continued)

*Primary Examiner* — John B Sotomayor
*Assistant Examiner* — Marcus Windrich
(74) *Attorney, Agent, or Firm* — Daly, Crowley, Mofford & Durkee, LLP

(57) ABSTRACT

The invention relates to a driver assistance device (2) for a vehicle (1), which driver assistance device has a radar appliance (3, 4) for determining at least one measured variable ($\alpha_1$, $\alpha_2$, $R_1$, $R_2$) referenced to an object (10) that is external to the vehicle, wherein the radar appliance (3, 4) comprises:

at least a first and a second reception antenna (14, 15), each for receiving signals ($S_{E1}$, $S_{E2}$), a first down-converter (17), which is coupled to the first reception antenna (14) via a first reception path (16), and a second down-converter (23), which is coupled to the second reception antenna (15) via a second reception path (21), each for down-converting the received signals ($S_{E1}$, $S_{E2}$) into respective baseband signals ($S_{B1}$, $S_{B2}$), and a control device (5) for receiving the baseband signals ($S_{B1}$, $S_{B2}$) and for determining the at least one measured variable ($\alpha_1$, $\alpha_2$, $R_1$, $R_2$) using the baseband signals ($S_{B1}$, $S_{B2}$), wherein the radar appliance (3, 4) has test means (32) for producing a local check signal ($S_P$) and for coupling same check signal ($S_P$) into the first reception path (16) and/or into the second reception path (21), as a result of which the control device (5) receives firstly the check signal ($S_P$) that has been down-converted by the first down-converter (17) as a first test signal ($S_{T1}$) and/or secondly the check signal ($S_P$) that has been down-converted by the second down-converter (23) as a second test signal ($S_{T2}$). The invention also relates to an appropriate method.

24 Claims, 4 Drawing Sheets

(51) Int. Cl.
*G01S 7/285* (2006.01)
*G01S 7/03* (2006.01)
*G01S 7/35* (2006.01)
*G01S 13/26* (2006.01)
*G01S 13/44* (2006.01)
*G01S 13/58* (2006.01)
*G01S 13/87* (2006.01)

(52) U.S. Cl.
CPC ............... *G01S 7/352* (2013.01); *G01S 7/4056* (2013.01); *G01S 13/26* (2013.01); *G01S 13/4454* (2013.01); *G01S 13/582* (2013.01); *G01S 13/584* (2013.01); *G01S 13/87* (2013.01); *G01S 2007/4069* (2013.01); *G01S 2013/9314* (2013.01); *G01S 2013/9321* (2013.01); *G01S 2013/9332* (2013.01); *G01S 2013/9378* (2013.01)

(56) References Cited

U.S. PATENT DOCUMENTS

| | | | | |
|---|---|---|---|---|
| 5,432,516 A | * | 7/1995 | Cherry et al. | 342/28 |
| 5,841,393 A | * | 11/1998 | Saito et al. | 342/165 |
| 5,861,834 A | * | 1/1999 | Sauer et al. | 342/13 |
| 6,559,792 B1 | * | 5/2003 | Douglas et al. | 342/173 |
| 2012/0088464 A1 | * | 4/2012 | Dehlink et al. | 455/255 |

FOREIGN PATENT DOCUMENTS

| | | |
|---|---|---|
| JP | 2009-294071 | 12/2009 |
| WO | WO 2011/001206 A1 | 1/2011 |
| WO | WO 2011001206 A1 * | 1/2011 |

OTHER PUBLICATIONS

Chinese Office Action dated Dec. 2, 2013 for Appl. No. 201180025861.X.

German Search Report dated Jan. 21, 2011 for Appl. No. 10 2010 012 624.1.

Japanese Office Action (w/English Translation) dated Feb. 16, 2015 for Appl. No. 2013-500449.

* cited by examiner

DRIVER ASSISTANCE DEVICE FOR A VEHICLE AND METHOD FOR OPERATING A RADAR DEVICE

CROSS REFERENCE TO RELATED APPLICATIONS

This application is a National Stage application of PCT/EP2011/054195 filed on Mar. 21, 2011 and published in the German language, and entitled "DRIVER ASSISTANCE DEVICE FOR A VEHICLE AND METHOD FOR OPERATING A RADAR DEVICE," which Claims priority to German application DE10 2010 012 624.1 filed on Mar. 24, 2010.

The invention relates to a driver assistance device for a vehicle, which driver assistance device has a radar appliance for determining at least one measured variable referenced to an object that is external to the vehicle. The radar appliance comprises at least a first and a second reception antenna, each for receiving signal. Furthermore, it also comprises a first and a second down-converter: the first down-converter is coupled to the first reception antenna via a first reception path, and the second down-converter is coupled to the second reception antenna via a second reception path. The down-converters are used to down-convert the received signals into respective baseband signals. The radar appliance also contains a control device for receiving the baseband signals and for determining the at least one measured variable using the baseband signals.

In the present case, the interest is in calibrating and/or checking the operational status of a radar appliance in a motor vehicle, namely particularly of a radar appliance which is used to determine a target angle for an object. The target angle is an angle between a connecting line that connects the radar appliance and an object that is external to the vehicle and a reference line which runs through the radar appliance. The interest is directed particularly at phase monopulse measurement. This method is used to determine the target angle and is a known method in radar engineering. Determination of the target angle, and also possibly further measured variables, requires at least two reception antennas, which may be two individual antennas and two reception antenna groups (arrays). The signals received by the reception antennas are conditioned in two separate reception channels or reception paths and processes digital signals using a control device. The target angle—and possibly further measured variables—is determined on the basis of the phase shift between the received signals.

A radar appliance thus requires two reception channels in order to ascertain the measured variables with a high level of precision. A reception channel or reception path comprises a reception antenna and a dowry-converter (reception mixer). However, the phase of the down-converted signals is determined not solely by the propagation path and the propagation properties in the air, that is to say not solely by the position of the object relative to the radar appliance, but is additionally highly dependent on the operating temperature, and also on the deviations in the production parameters of the components of the radar appliance, namely particularly of the down-converters, and on the integration thereof into the housing of the radar appliance. The following problem therefore exists: the first reception path, including the first down-converter, can cause a different shift in the phase of the received signal than the second reception path, including the second down-converter. When determining the measured variables, however, it is assumed that the respective phase shifts by the first and second reception paths are the same. If these shifts in the phase are different, it is not possible to achieve maximum-precision determination of the measured variables—particularly of the target angle. There is a particular challenge in firstly correcting errors in the determination of a measured variable and secondly checking the individual reception paths for functional status in the first place.

It is an object of the invention to demonstrate a way in which a radar appliance in a driver assistance device of the type in question mentioned at the outset can be operated particularly reliably.

The invention achieves this object by means of a driver assistance device having the features according to patent claim 1, by a vehicle having the features according to patent claim 12 and by a method having the features according to patent claim 13. Advantageous embodiments of the invention are the subject matter of the dependent patent claims and of the description.

A radar appliance in a driver assistance device according to the invention is used for determining at least one measured variable referenced to an object that is external to the vehicle. It comprises at least a first and a second reception antenna, each for receiving signals. The first reception antenna has a first down-converter coupled to it, namely via a first reception path the second reception antenna has a second down-converter coupled to it, namely via a second reception path. The down-converters are used to down-convert the received signals into respective baseband signals. A control device receives the baseband signals and determines the at east one measured variable using the baseband signals. According to the invention, the radar appliance has test means which are designed to produce a local check signal and to couple the same check signal into the first reception path and/or into the second reception path. The control device receives firstly the check signal that has been down-converted by the first down-converter as a first test signal and/or secondly the check signal that has been down-converted by the second down-converter as a second test signal.

Thus, the invention provides the radar appliance with test means which produce a local check signal and couple said local check signal into the first and/or the second reception path. The first down-converter takes the check signal and produces a first test signal, i.e. the check signal in baseband; the second down-converter accordingly takes the local check signal and produces a second test signal. Such an approach has various advantages: the control device can check the operational status of the respective reception paths, namely using the first and second test signals. Specifically, the control device can prompt the production of the local check signal so as then to be able to check whether or not the first and/or the second test signal is/are present in the first place. In this way it is possible to successfully check the ready-to-receive status of the respective reception paths. The provision of and coupling of the check signal both into the first and into the second reception path have the advantage that the control device is able to detect any discrepancy in the phase shift by the two reception paths and to correct the measured variable if appropriate. The reason is that the control device can use the respective phases of the first and second test signals to recognize whether or not the two reception paths have the same phase properties. The driver assistance device according to the invention can therefore determine the at least one measured variable with utmost precision, namely independently of the influence of the operating temperature and other parameters—such as particularly production parameters of semiconductor chips and the integration thereof into the housing of the radar appliance—on the phase shift by the respective reception paths. In particular, the determination of a target angle for an object that is external to the vehicle with a high level of precision is therefore assured.

In one embodiment, it is thus possible for the control device to use firstly the first test signal and/or secondly the second test signal to check the first and/or the second reception path for operational status. As already explained, it is therefore possible to check the ready-to-receive status of the respective functional paths, and the control device can recognize any operating error or any faulty reception path, and can also output an appropriate error message. Such an error message may explicitly flag the erroneous reception path end/or the entire radar appliance, so that an engineer is explicitly informed about which radar appliance is actually faulty. The engineer does not need to check all of the radar appliances which are present in the vehicle separately. Thus, the check on the respective reception paths may involve the check signal being produced and the control device checking the presence of the respective test signals.

It is thus found to be particularly advantageous if the local check signal is coupled both in to the first reception path and into the second reception path. In that case, the control device is able—as already explained—to take the first test signal and the second test signal and determine a correction variable which is used for correcting the at least one measured variable. This increases the precision when determining the measured variable; the reason is that the latter is corrected using the correction variable. It is therefore possible to reduce the influence of the operating temperature and of other operations related and manufacture-related parameters on the properties—particularly phase properties—of the reception paths and of the down-converters and hence on the determination of the measured variable as a whole to a minimum.

Preferably, the correction variable is a phase difference between a phase of the first test signal and a phase of the second test signal. It is therefore possible to determine such measured variables as are ascertained on the basis of the respective phase information from received signals with utmost precision. Specifically, it is therefore possible to determine a target angle, for example, with utmost precision.

The measured variable may thus be a target angle. The latter is defined as follows: a target angle is an angle between a reference line running through the radar appliance and a connecting line which runs through the radar appliance and the object.

As already explained, the control device can use the local check signal to check the reception paths for their respective operational status and/or to determine a correction variable and can use same correction variable to correct the at least one measured variable—namely particularly the target angle. The latter approach is more or less "self"—calibration of the radar appliance. Such calibration and/or the cited check on the manner of operation of the first and/or second reception path can take place in the radar appliance in a test mode. This test mode is preferably a separate mode from a normal mode or operating mode in which the radar appliance sends transmission signals and processes the received signals. In the test mode, the radar appliance therefore preferably sends no transmission signals. In one implementation of this embodiment, it is possible to perform a method of this kind, for example: in the test mode, the radar appliance produces the local check signal and couples it into the two reception paths. During the period in which the check signal is provided, the radar appliance sends no transmission signals, which means that in principle no signals can be received by the reception antennas either. The check signal is down-converted, namely to baseband, both by the first down-converter and by the second down-converter; the first down-converter outputs a first test signal to the control device, and the second down-converter outputs a second test signal to the control device. The control device calculates a difference between the phases of the first and second test signals. This difference in the phase is stored by the control device, namely for later correction of a measured variable, for example the target angle. Such a test mode may last for a very short period. By way of example, the period of such a test mode may be in a range of values from 100 μs to 1 ms. Once the difference in the phase and/or another correction variable has been determined by the control device, the test mode can be terminated, and the radar appliance changes to an operating mode. In such an operating mode, the radar appliance can send a predetermined number of frequency-modulated signal pulses (also known by the term "chirps"). The first and second reception antennas then each receive a received signal, which is the transmission signal reflected by an object. The down-converters down-convert the received signals and provide respective baseband signals for the control device. From the baseband signals, the control device determines the measured variable—for example the target angle—initially independently of the phase difference determined in the test mode. The measured variable determined in this manner is subsequently corrected using the phase difference. The radar appliance can change to the test mode before each operating mode or each measurement cycle, in which a respective predetermined number of frequency-modulated signal pulses is sent by the radar appliance. The determination of the correction variable before each measurement cycle ensures that the measured variable can be determined with utmost precision after each measurement cycle.

Instead of producing the local check signal only in a test mode of the radar appliance, same check signal can also be produced constantly by the control device, namely during the operation of the radar appliance. In that case, a frequency component—known to the control device—is obtained continually in the respective baseband signals. Since this frequency is known, it can then be rejected by the control device—for example by a notch filter.

In one embodiment, provision is made for the test means—which are used to produce and couple the local check signal into the first and/or the second reception path—to contain an up-converter. Such an up-converter can then produce the local check signal. An output of the up-converter may be coupled firstly to the first reception path and/or secondly to the second reception path. The local check signal can be coupled into each reception path using a directional coupler, for example. The two directional couplers are then preferably of the same design, which means that the resultant coupling into the two reception paths is symmetrical. The use of an up-converter allows a pilot signal produced by the control device at a predefined frequency to be up-converted to an operating frequency for the respective reception paths or for the radar appliance, as a result of which a check on the reception paths at the operating frequency of the radar appliance is possible. The down-converters can then down-convert the check signal back to baseband, namely into the respective test signals.

With regard to a compact, reduced-component and installation-space-saving radar appliance, it is found to be particularly advantageous if same radar appliance has a local oscillator which is shared by the first and second down-converters and by the up-converter and which is used to provide an oscillator signal. The up-converter can therefore be fed the oscillator signal from a local oscillator which is present in the radar appliance anyway. The radar appliance therefore does not require an additional oscillator; the use of an additional component with the associated drawbacks regarding installation space, weight and costs is unnecessary.

The local oscillator is preferably coupled to an input of the up-converter via a directional/coupler or a power splitter or a similar component. Preferably, just a small portion of the power from the oscillator signal is tapped off for the up-converter. Specifically, the directional coupler or the power splitter can tap off a portion from a range of values from −25 dB to −15 dB from the power of the oscillator signal for the up-converter. By way of example, it is utterly possible to tap off a power in a range of values from −25 dBm to −15 dBm for the up-converter. By feeding the up-converter a low-power oscillator signal of this kind, there is no need to use an additional amplifier for that portion of the oscillator signal which is used for feeding the down-converters. There is also no additional amplifier required for the oscillator signal that is tapped off for the up-converter. The up-converter is thus fed with a relatively low-level oscillator signal; by contrast, the power in a pilot signal from which the up-converter produces the local check signal may be correspondingly higher, which means that the diodes in the up-converter are turned on.

The check signal has preferably been subjected to single-sideband modulation. In this embodiment, the up-converter can receive a first pilot signal—at a predefined frequency—and a second pilot signal, the phase of which is shifted through 90° relative to the first pilot signal, from the control device. The up-converter can then produce the single-sideband-modulated check signal from the first and second pilot signals. Thus, the up-converter may be a single-sideband up-converter. Numerous measurements have shown that such single-sideband modulation of the check signal allows the detection of the entire phase error in the two reception paths, including the down-converters. By contrast, this is not possible, or is possible only with increased complexity, using a double-sideband up-converter; the reason is that a simple double-sideband up-converter can be used to detect at best a fraction of the phase error. The single-sideband modulation accordingly ensures that the phase difference between the two test signals and hence also the measured variables from the radar appliance are determined with the utmost precision.

The radar appliance is preferably a continuous wave radar which is designed to emit a frequency-modulated continuous electromagnetic wave (also known by the term FMCW (Frequency Modulated Continuous Wave) radar). Such a radar appliance can be successfully used to determine the range of an object from same radar appliance, and also the relative speed of the object in relation to the radar appliance and also the target angle. A receiver in the radar appliance may also comprise—apart from the two down-converters—a low-pass filter, an amplifier and an analog/digital converter for each reception path. The signals received by the first and second reception antennas are then down converted to baseband, low-pass filtered and subjected to analog/digital conversion in the receiver.

The radar appliance preferably involves the use of a separate transmission antenna—be it an individual transmission antenna or a group of transmission antennas—which is fed by means of a local oscillator in order to produce a transmission signal. The transmission antenna can be phase-controlled so as to be able to capture a relatively wide surrounding region all in all with a narrow main lobe for the directional characteristic in the horizontal direction.

A wide variety of applications for the driver assistance device in the motor vehicle are reasonably possible: by way of example, the driver assistance device can be used for lane change assistance, for monitoring blind spots and for the early recognition of accidents. Alternatively, the driver assistance device may have the function of an automatic distance warning system, an adaptive cruise control system, a lane departure warning system and/or a parking assistant.

A vehicle according to the invention, particularly a motor vehicle, comprises a driver assistance device according to the invention or a preferred refinement of the driver assistance device.

In the case of a method according to the invention for operating a radar appliance in a vehicle, same radar appliance determines at least one measured variable referenced to an object that is external to the vehicle. Signals are received by at least a first and a second reception antenna. The received signals are down-converted into respective baseband signals firstly by a first down-converter, which is coupled to the first reception antenna via a first reception path, and secondly by a second down-converter, which is coupled to the second reception antenna via a second reception path. A control device receives the baseband signals and determines the at least one measured variable from the baseband signals. A local check signal is produced in the radar appliance and is coupled into the first reception path and/or into the second reception path. The control device receives firstly the check signal that has been down-converted by the first down-converter as a first test signal and/or secondly the check signal that has been down-converted by the second down-converter as a second test signal.

The preferred embodiments presented with reference to the driver assistance device according to the invention, and the advantages of said embodiments, apply in corresponding fashion to the vehicle according to the invention and to the method according to the invention.

Further features of the invention are evident from the claims, the figures and the description of the figures. All features and feature combinations cited above in the description and also the features and feature combinations that are cited below in the description of the figures and/or that are shown in the figures alone can be used not only in the respectively indicated combination but also in other combinations or else on their own.

The invention will now be explained in more detail using a single preferred exemplary embodiment and with reference to the appended drawings, in which.

In the figures, elements which are the same and have the same function are provided with the same reference symbols.

Figure 1:
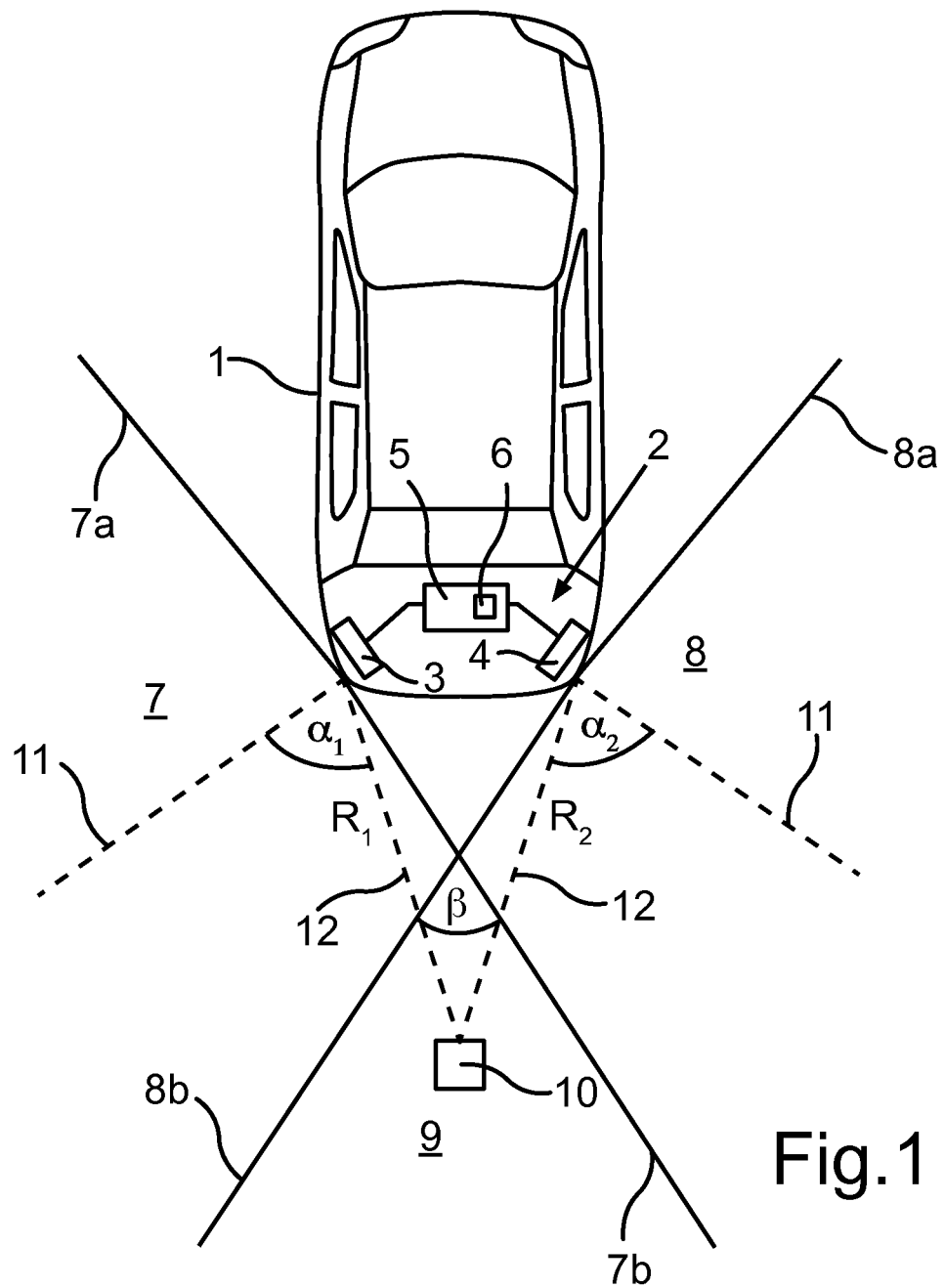
FIG. 1 shows a schematic illustration of a plan view of a motor vehicle with a driver assistance device according to an embodiment of the invention.

A motor vehicle 1, as shown in FIG. 1, comprises a driver assistance device 2 which assists the driver in driving the motor vehicle 1. In the exemplary embodiment, the motor vehicle 1 is an automobile. The driver assistance device 2 may be a monitoring system for blind spots and/or an accident early recognition system and/or an ACC (Adaptive Cruise Control) System.

The driver assistance device 2 comprises a first radar appliance 3 and also a second radar appliance 4. The first radar appliance 3 is arranged in a left-hand corner of a rear bumper and the second radar appliance 4 is arranged in a right-hand corner of the same bumper. The first and second radar appliances 3, 4 are frequency-modulated continuous wave radar appliances (FMCW radar). The radar appliances 3, 4 also include a control device 5, which may comprise a microcontroller 6 that is shared by the first and second radar appliances 3, 4, for example, and also a digital signal processor—not shown in the figures. Alternatively, two separate microcontrollers 6 and/or two digital signal processors may also be provided which communicate with one another via a communication bus that is present in the motor vehicle 1, for example.

The first radar appliance 3 has a capture region 7 which is bounded by two lines 7a, 7b in FIG. 1. The aperture angle of the capture region 7—that is to say the angle between the lines 7a, 7b—is approximately 170° in the example. Correspondingly, the second radar appliance 4 has a capture region 8 which is bounded by two lines 8a, 8b. The aperture angle of the capture region 8—that is to say the angle between the lines 8a, 8b—is likewise approximately 170° in the exemplary embodiment. The capture regions 7, 8 of the radar appliances 3, 4 intersect, which means that there is an overlap region 9. The overlap region 9 is bounded in angular fashion by the lines 7b, 8b. In the exemplary embodiment, an aperture angle β of the overlap region 9 is approximately 70°.

In their respective capture regions 7, 8, the radar appliances 3, 4 are able to locate an object 10. In particular, the radar appliances 3, 4 can determine a respective range $R_1$, $R_2$, for the object 10 from the respective radar appliance 3, 4, a respective target angle $\alpha_1$, $\alpha_2$ and a relative speed for the object 10 in relation to the motor vehicle 1—these are measured variables for the radar appliances 3, 4. The target angles $\alpha_1$, $\alpha_2$ are angles between a respective reference line 11, which runs through the relevant radar appliance 3, 4, and a connecting line 12, which runs through the object 10 and the respective radar appliance 3, 4.

The radar appliances 3, 4 can measure the respective target angle $\alpha_1$, $\alpha_2$ using the phase monopulse method.

Figure 2:
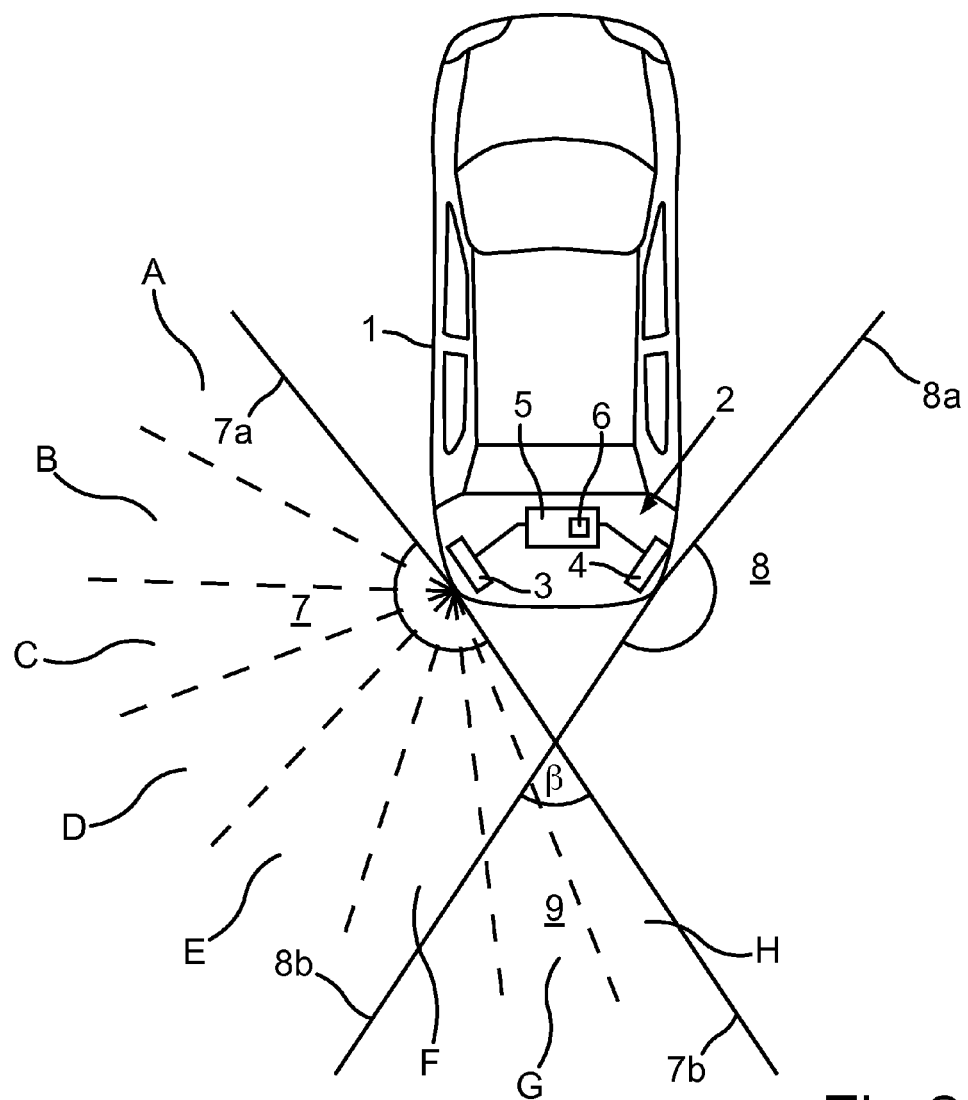
FIG. 2 shows a schematic illustration of a plan view of the motor vehicle shown in FIG. 1, with the capture of various subranges by a radar appliance being explained in more detail.

With reference to FIG. 2, the radar appliance 3—and similarly also the radar appliance 4—can examine various subregions A, B, C, D, E, F, G, H of the capture region 7 in succession. By way of example, this can be done by swiveling a transmission lobe from a transmission antenna electronically in a horizontal direction, namely using the phase array principle. In this case, at least one reception antenna may have a wide reception characteristic in the horizontal direction, said reception characteristic covering the entire capture region 7. Other refinements may alternatively implement narrow reception angle regions in combination with wide transmission lobes.

For the sake of clarity, FIG. 2 shows only subregions A to H from the capture region 7 of the first radar appliance 3. Correspondingly, the capture region 8 of the radar appliance 4 is in this case also divided into a plurality of subregions which the radar appliance 4 captures in succession. Although the remainder of the description relates only to the radar appliance 3, the manner of operation of the radar appliance 4 corresponds to that of the radar appliance 3.

In the operating mode or in an individual measurement cycle, subregions A to H are captured in succession by the radar appliance 3. In an individual measurement cycle, the radar appliance 3 separately sends a respective predetermined series of frequency-modulated signal pulses (chirps) for each subregion A to H (that is to say per beam). Thus, the radar appliance 3 sends a respective series of frequency-modulated signal pulse per measurement cycle and per subregion A to H. In the operating mode, subregions A to H are therefore examined at successive times, and objects situated in subregions A to H are detected. Before each measurement cycle or before the initiation of the operating mode—i.e. before each examination of all the subregions A to H—the radar appliance 3 initially changes—as explained in more detail below—to a test mode.

Figure 3:
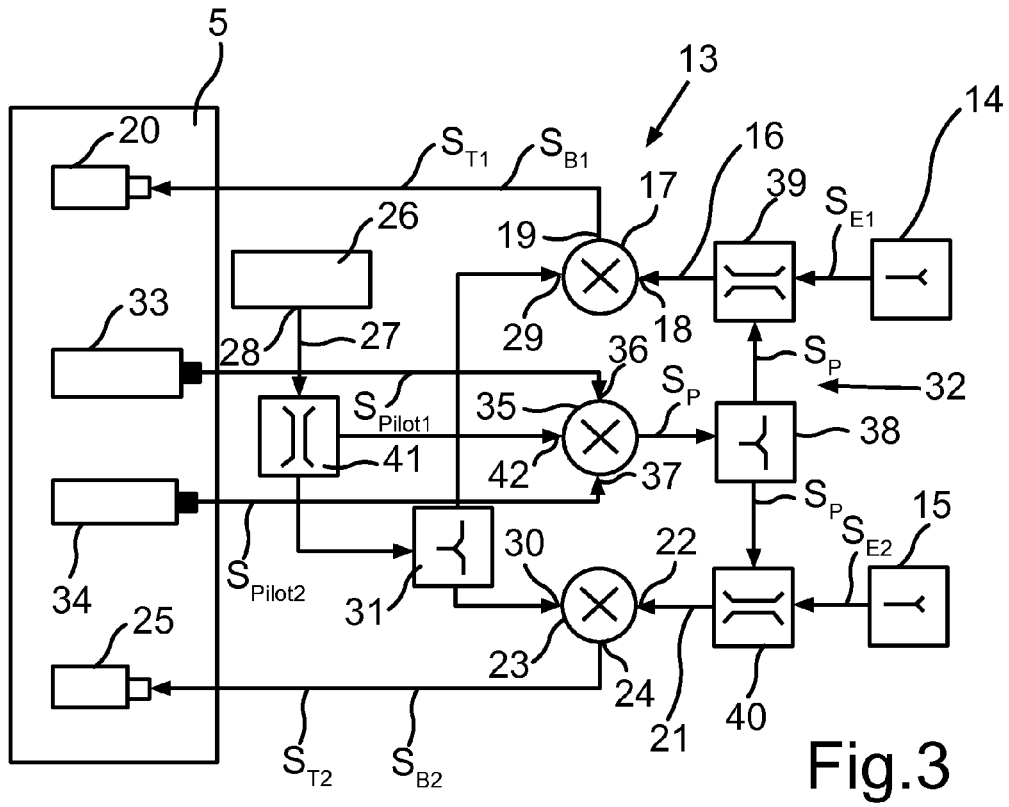
FIG. 3 shows a schematic illustration of a radar appliance in the driver assistance device.

FIG. 3 shows a schematic illustration of the design of a receiver 13 in an individual radar appliance 3, 4. The receiver 13 comprises a first and a second reception antenna 14, 15, which may be individual antennas or a respective group of antennas. The first reception antenna 14 is coupled to a first down-converter 17, namely to the RF (Radio Frequency) input 18 thereof, via a first reception path or reception channel 16. An output 19 of the first down-converter 17 is coupled to the control device 5, specifically to a first channel input 20. The output 19 of the down-converter 17 may also be coupled to the control device 5 via an analog/digital converter (not shown). Alternatively, such a converter may be integrated in the control device 5.

Correspondingly, the second reception antenna 15 is coupled to an RF input 22 of a second down-converter 23 via a second reception path 21. An output 24 of the second down-converter 23 is likewise coupled to the control device 5, namely to the second channel input 25 thereof. In this case too, an analog/digital converter may be connected between the control device 5 and the second down-converter 23; alternatively, such a converter may be integrated in the control device 5.

The respective reception paths 16, 21 may each also have a low noise amplifier integrated in them.

A local oscillator 26 provides an oscillator signal or an LO (Local Oscillator) signal 27, namely at an output 28. The oscillator signal 27 is used to feed the down-converters 17, 23 via respective LO inputs 29, 30. To this end, the oscillator signal 27 is split symmetrically using a power splitter 31.

The first and second reception antennas 14, 15 receive signals $S_{E1}$, $S_{E2}$. These are received signals. The signals $S_{E1}$, $S_{E2}$ are the transmission signals reflected by an object. The received signals $S_{E1}$, $S_{E2}$ are down-converted, namely to baseband, by the respective down-converters 17, 23. The respective outputs 19, 24 of the down-converters 17, 23 output baseband signals $S_{B1}$, $S_{B2}$. These baseband signals $S_{B1}$, $S_{B2}$ are then subjected to analog/digital conversion and are processed by the control device 5. The control device 5 uses the baseband signals $S_{B1}$, $S_{B2}$ to determine the measured variables for the radar appliance 3, 4, namely the range $R_1$, $R_2$, the relative speed, and also the target angle $\alpha_2$.

The angle information from the received signals $S_{E1}$, $S_{E2}$ is ascertained in the control device 5 from a difference in the phases of the baseband signals $S_{B1}$, $S_{B2}$. The output phase of the down-converters 17, 23 is not determined solely by the signals $S_{E1}$, $S_{E2}$ from the two reception paths 16, 21, however, but rather is additionally also dependent on the operating temperature and also on the fluctuations in the production parameters for the down-converters 17, 23 into the integration thereof in a housing. By way of example, the target angle $\alpha_1$, $\alpha_2$ is ascertained on the basis of a phase shift between the baseband signals $S_{B1}$, $S_{B2}$.

In order to ensure that the target angle $\alpha_1$, $\alpha_2$, and also the range $R_1$, $R_2$ and the relative speed are determined with utmost precision, the receiver 13 has test means 32. The test means 32 are designed to produce a local check signal $S_P$ and to couple same check signal $S_P$ both into the first and into the second reception path 16, 21 symmetrically. The local check signal $S_P$ has been subject to the single-sideband modulation.

A first pilot output 33 of the control device 5 produces a first pilot signal $S_{Pilot1}$; a second pilot output 34 of said control device produces a second pilot signal $S_{Pilot2}$. The first pilot signal $S_{Pilot1}$ may be a harmonic signal—for example a sine signal. The first pilot signal $S_{Pilot1}$ may have a predetermined frequency. The second pilot signal $S_{Pilot2}$ is an identical signal and phase-shifted through 90°. By way of example, the two pilot signals $S_{Pilot1}$, $S_{Pilot2}$ can be produced using a small oscillator in the control device 5.

The test means 32 comprise an up-converter 35 which is designed for single-sideband modulation and is therefore a single-sideband mixer. A first input 36 of the up-converter 35 is coupled to the first pilot output 32, while a second input 37 of the up-converter 35 is coupled to the second pilot output 34. The up-converter 36 up-converts the two pilot signals $S_{Pilot1}$, $S_{Pilot2}$ and overloads them, namely to form the local check signal $S_P$. The radio-frequency local check signal $S_P$ has such a frequency as corresponds to the mean frequency of the transmission signals from the radar appliance 3, 4. The local check signal $S_P$ is—as already explained—coupled into the first and second reception paths 16, 21 symmetrically. To this end, the test means 32 comprise a symmetric power splitter 38 which splits the local check signal $S_P$. In this case, the power in the check signal $S_P$ is halved. The check signal $S_P$ is coupled into the reception path 16, 21 using a directional coupler 39, 40. The directional couplers 39, 40 are of the same design.

The local oscillator 26 is an oscillator which is shared by the down-converters 17, 23 and by the up-converter 35. It is actuated by the control device 5. By way of example, the oscillator 26 is a voltage controlled oscillator (voltage control oscillator) which produces the oscillator signal 27 at such a frequency as is dependent on the amplitude of a DC voltage provided on the oscillator 26 by the control device 5.

A portion of the power in the oscillator signal 27 is coupled out for the up-converter 35, namely using a directional coupler 41, for example. This tapped-off oscillator signal 27 is used to feed the up-converter 35, specifically at an LO input 42. This portion of the power from the oscillator signal 27 that is coupled out for the up-converter 35 is preferably a very small portion, namely −20 dBm, for example. An additional amplifier for the LO input 42, and also for that oscillator signal 27 which is fed to the down-converters 17, 23, is unnecessary. The reason is that the pilot signals $S_{Pilot1}$, $S_{Pilot2}$ are produced at a correspondingly higher power.

Thus, the local check signal $S_P$ is coupled firstly into the first reception path 16 and secondly into the second reception path 21. The check signal $S_P$ is therefore down-converted, namely to baseband, firstly by the first down-converter 17 and secondly by the second down-converter 23. In this case, the first down-converter 17 outputs a first test signal $S_{T1}$ from the check signal $S_P$, while the second down-converter 23 outputs the second test signal $S_{T2}$. The test signals $S_{T1}$, $S_{T2}$ are received via the control device 5, namely at the respective channel inputs 20, 25.

As already explained, the radar appliance 3, 4 changes to the test mode, specifically before each measurement cycle or before the initiation of each operating mode. In this test mode, the control device 5 initially checks the reception paths 16, 21 for their operational status. To this end, the control device 5 produces the pilot signals $S_{Pilot1}$, $S_{Pilot2}$ and checks whether or not the test signals $S_{T1}$, $S_{T2}$ are applied to the respective channel inputs 20, 25. If the test signals $S_{T1}$, $S_{T2}$ can be detected by the control device 5, the two reception paths 16, 21 and also the down-converters 17, 23 are operational.

On the basis of the test signals $S_{T1}$, $S_{T2}$, the control device 5 also ascertains a correction variable for correcting the measured variables. Specifically, the control device 5 can calculate a phase difference between the phase of the first test signal $S_{T1}$ and the phase of the second test signal $S_{T2}$ as a correction variable. This phase difference is then used by the control device 5 to correct the measured variables, particularly the target angle $\alpha_1$, $\alpha_2$. This is because the phase difference reproduces the differences in the propagation and phase properties of the two reception paths 16, 21 and of the down-inverters 17, 23 and possibly of further components of the receiver 13. Hence, it is possible to take account of any imprecisions or deviations from a setpoint measurement which are present when determining the measured variables.

Instead of producing the pilot signals $S_{Pilot1}$, $S_{Pilot2}$ and hence the local check signal $S_P$ in a test mode of the radar appliance 3, 4, same signals $S_{Pilot1}$, $S_{Pilot2}$, $S_P$ can also be produced constantly by the control device 5, namely during the operation of the radar appliance 3, 4. In that case, a frequency component which corresponds to the pilot signal $S_{Pilot1}$, $S_{Pilot2}$ is obtained continually in the respective baseband signals $S_{B1}$, $S_{B2}$. Since this frequency is known, it can then be rejected by the control device 5—for example by a notch filter.

Figure 4:
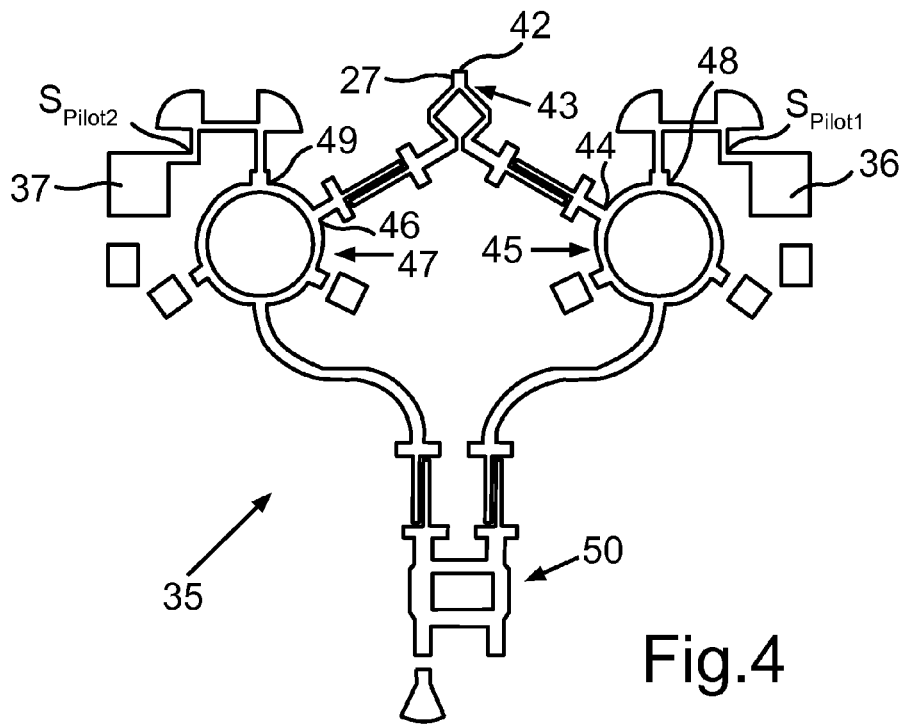
FIG. 4 shows a schematic illustration of a general arrangement plan (RF-Layout) of an up-converter in the radar appliance.

FIG. 4 shows a schematic illustration of a general arrangement (RF layout) of the up-converter 35 using microstrip technology. The up-converter 35 is what is known as a rat race mixer with diodes (not shown). The LO input 42 has the oscillator signal 27 applied to it. The oscillator signal 27 is halved using a power splitter 43 and propagates firstly toward a first port 44 of a first annular coupler 45 and secondly toward a first port 46 of a second annular coupler 47. From the first input 36 of the up-converter 35, the first pilot signal $S_{Pilot1}$ propagates toward a second port 48 of the coupler 45. Correspondingly, the second pilot signal $S_{Pilot2}$ propagates from the second input 37 toward a second port 49 of the second coupler 47. The first pilot signal $S_{Pilot1}$ and the oscillator signal 27, on the one hand, and the second pilot signal $S_{Pilot2}$ and the oscillator signal 27, on the other hand, overlap and the respective superpositions propagate toward a 90° hybrid coupler 50. There, these superpositions overlap, as a result of which the local check signal $S_P$ is output.

Figure 5:
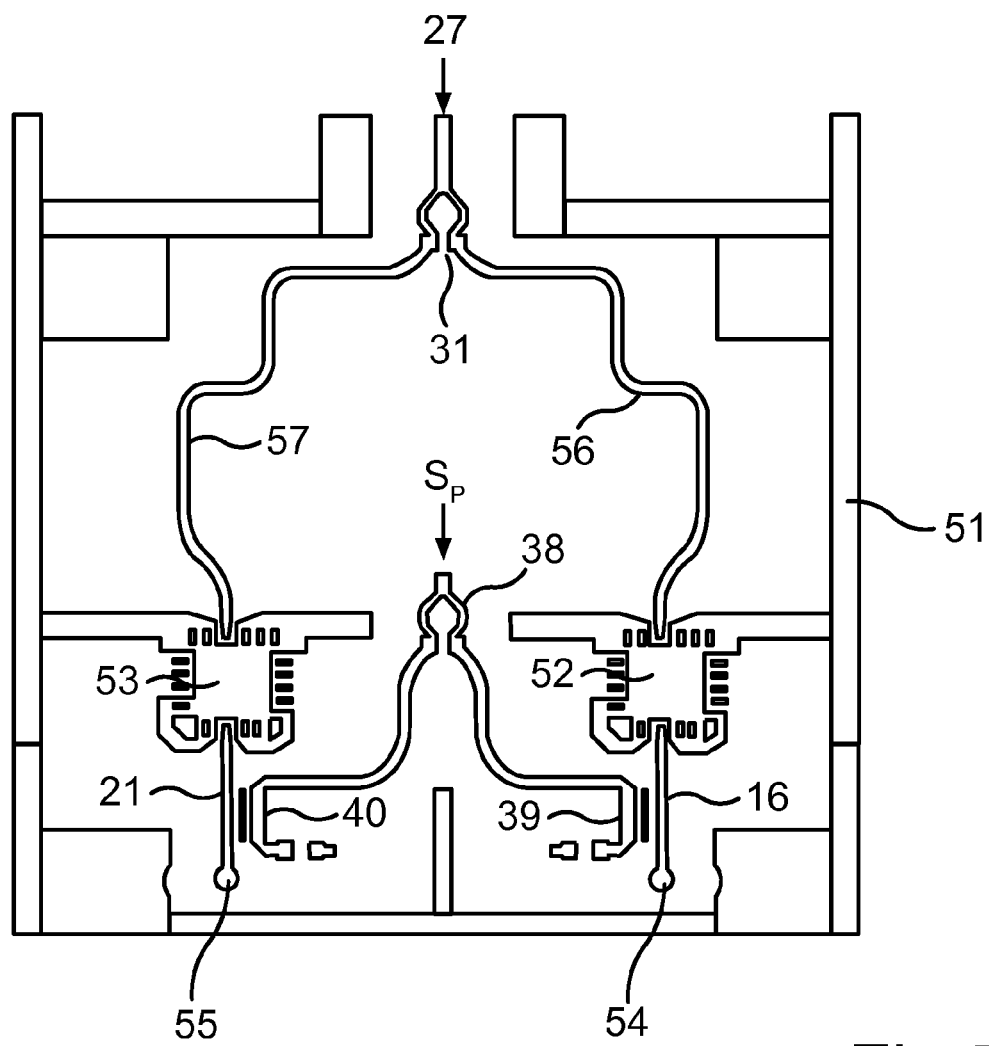
FIG. 5 shows a schematic illustration of a general arrangement plan (RF-Layout) of the radar appliance.

FIG. 5 likewise shows a schematic illustration of the general arrangement (RF layout) of the receiver 13. A ground plane is denoted by 51 in FIG. 5. Two mounting areas 52, 53 are provided on which the first down-converter 17 and the second down-converter 23 are mounted. Furthermore, FIG. 5 reveals respective microstriplines which form the first and second reception paths 16, 21. These lines are firstly coupled to connections 54, 55 for the reception antennas 14, 15 and are secondly routed to the mounting areas 52, 53 so as to be connected to the respective down-converters 17, 23 at those points. The local check signal $S_P$ is coupled into the reception paths 16, 21 via the power splitter 38 using microstrip technology and via the respective directional couplers 39, 40. The power splitter 31 is also provided using microstrip technology and is coupled firstly to the first down-converter 17 via a microstripline 56 and to the second down-converter 23 via a further microstripline 57.

The directional couplers 39, 40 are of identical design. The power spotter 38 is a symmetric power splitter, which means that the power of the local check signal $S_P$ is halved.

The invention claimed is:

1. A driver assistance device for a vehicle, the driver assistance device having a radar appliance for determining at least one measured variable ($\alpha_1$, $\alpha_2$, $R_1$, $R_2$) referenced to an object that is external to the vehicle, the radar appliance comprising:
   at least a first and a second reception antenna, each for receiving signals ($S_{E1}$, $S_{E2}$);
   a first down-converter, which is coupled to the first reception antenna via a first reception path, and a second down-converter, which is coupled to the second reception antenna via a second reception path, each for down-converting the received signals ($S_{E1}$, $S_{E2}$) into respective baseband signals ($S_{B1}$, $S_{B2}$);

a control device for receiving the baseband signals ($S_{B1}$, $S_{B2}$) and for determining the at least one measured variable ($\alpha_1$, $\alpha_2$, $R_1$, $R_2$) using the baseband signals ($S_{B1}$, $S_{B2}$);

test means for producing a local single-sideband-modulated check signal ($S_P$) and for coupling the check signal ($S_P$) into the first reception path and into the second reception path, as a result of which the control device receives firstly the check signal ($S_P$) that has been down-converted by the first down-converter as a first test signal ($S_{T1}$) and/or secondly the check signal ($S_P$) that has been down-converted by the second down-converter as a second test signal ($S_{T2}$) wherein said test means comprises;

an up-converter for producing the local check signal ($S_P$), the output of said up-converter being coupled firstly to the first reception path and secondly to the second reception path;

a local oscillator for providing an oscillator signal, said local oscillator being shared by the first and second down-converters and by the up-converter; and wherein the local oscillator is coupled to an input of the up-converter via a directional coupler or a power splitter, wherein the directional coupler or the power splitter is designed to tap off a portion of between −25 dB and −15 dB from a power of the oscillator signal for the up-converter.

2. A driver assistance device for a vehicle, which driver assistance device has a radar appliance for determining at least one measured variable ($\alpha_1$, $\alpha_2$, $R_1$, $R_2$) referenced to an object that is external to the vehicle, wherein the radar appliance comprises:

at least a first and a second reception antenna, each for receiving signals $S_{E1}$, $S_{E2}$);

a first down-converter, which is coupled to the first reception antenna via a first reception path, and a second down-converter, which is coupled to the second reception antenna via a second reception path, each for down-converting the received signals ($S_{E1}$, $S_{E2}$) into respective baseband signals ($S_{B1}$, $S_{B2}$);

a control device for receiving the baseband signals ($S_{B1}$, $S_{B2}$) and for determining the at least one measured variable ($\alpha_1$, $\alpha_2$, $R_1$, $R_2$) using the baseband signals ($S_{B1}$, $S_{B2}$);

test means for producing a local single-sideband-modulated check signal ($S_P$) and for coupling the check signal ($S_P$) into the first reception path and into the second reception path, as a result of which the control device receives firstly the check signal ($S_P$) that has been down-converted by the first down-converter as a first test signal ($S_{T1}$) and/or secondly the check signal ($S_P$) that has been down-converted by the second down-converter as a second test signal $S_{T2}$, said test means comprising;

a first pilot signal source configured to provide a first pilot signal at an output thereof;

a second pilot signal source configured to provide a second pilot signal ($S_{Pilot2}$) at an output thereof, with second pilot signal ($S_{Pilot2}$) phase-shifted by 90° with respect to the first pilot signal ($S_{Pilot1}$); and an up-converter having a first input coupled to the output of said first pilot signal source and configured to receive the first pilot signal ($S_{Pilot1}$) and having a second input coupled to the output of said second pilot signal source and configured to receive the second pilot signal ($S_{Pilot2}$), said upconverter configured to produce the single-sideband-modulated check signal ($S_P$) from the first and second pilot signals ($S_{Pilot1}$, $S_{Pilot2}$).

3. A radar appliance for use with a driver assistance device, the radar appliance comprising:

at least first and a second reception antennas, each having an RF frequency band and operable to receive RF signals within the RF frequency band;

at least first and second down-converters, each coupled to receive signals from a respective one of said first and second reception antennas via respective ones of first and second reception paths, each of said at least first and second down-converters for down-converting signals provided thereto from respective ones of said at least first and second reception antennas into respective baseband signals;

test means configured to receive first and second pilot signals and in response thereto to produce a local single-sideband-modulated check signal having a frequency within the RF frequency band of the at least first and second reception antennas, said test means for coupling the single-sideband-modulated check signal into the first reception path and into the second reception path;

a control device for receiving the baseband signals and for receiving firstly the check signal that has been down-converted by the first down-converter as a first test signal and/or secondly the check signal that has been down-converted by the second down-converter as a second test signal and for determining at least one measured variable using the signals provided thereto, said control device comprising a notch filter configured to reject a signal component having a frequency which corresponds to at least one of the first and second pilot signals.

4. The radar appliance as claimed in claim 3, wherein said test means comprises an up-converter having an output coupled to said first reception path and to said second reception path, said up-converter for producing the local check signal.

5. The radar appliance as claimed in claim 4, further comprising a local oscillator coupled to said first and second down-converters and to said up-converter, said local oscillator for providing an oscillator signal.

6. The radar appliance as claimed in claim 5, wherein said local oscillator is coupled to an input of the up-converter via a coupling device which couples a portion of the oscillator signal for the up-converter.

7. The radar appliance as claimed in claim 6, wherein:
said coupling device is one of: a directional coupler; or a power splitter; and
said coupling device couples a portion of the oscillator signal in the range of about −25 dB to about −15 dB.

8. A radar appliance for use with a driver assistance device, the radar appliance comprising:

at least first and a second reception antennas, each for receiving signals;

at least first and second down-converters, each coupled to receive signals from a respective one of said first and second reception antennas via respective ones of first and second reception paths, each of said at least first and second down-converters for down-converting signals provided thereto from respective ones of said at least first and second reception antennas into respective baseband signals;

test means for producing a local single-sideband-modulated check signal and for coupling the check signal into the first reception path and into the second reception path wherein said test means comprises an up-converter having an output coupled to said first reception path and to said second reception path, said up-converter for producing the local single-sideband-modulated check signal;

a control device for receiving the baseband signals and for receiving firstly the check signal that has been down-converted by the first down-converter as a first test signal and/or secondly the check signal that has been down-converted by the second down-converter as a second test signal and for determining at least one measured variable using the signals provided thereto and for providing first and second pilot signals; and wherein said up-converter is configured to receive the first pilot signal at a first input and a second pilot signal at a second input and wherein said control device sets the first and second pilot signals ninety degrees (90°) out of phase such that said up-converter produces the single-sideband-modulated check signal ($S_P$) from the first and second pilot signals ($S_{Pilot1}$, $S_{Pilot2}$).

9. A method for operating a radar appliance in a vehicle, wherein the radar appliance sends transmission signals having a frequency within an RF frequency band and processes received RF signals and determines at least one measured variable ($\alpha_1$, $\alpha_2$, $R_1$, $R_2$) referenced to an object that is external to the vehicle, the method comprising:

receiving a first RF signal having a frequency within the RF frequency band from a first reception antenna, the first RF signal corresponding to the transmission signal reflected by an object;

receiving a second RF signal having a frequency within the RF frequency band from a second reception antenna, the second RF signal corresponding to the transmission signal reflected by an object;

coupling the first RF signal from an output of the first reception antenna to an input of a first down-converter via a first reception path;

coupling the second RF signal from an output of the second reception antenna to an input of a second down-converter via a second reception path;

down-converting, via the first down-converter, the first received signal into a first baseband signal;

down-converting, via the second down-converter, the second received signal into a second baseband signal;

generating a local single-sideband-modulated check signal having an RF frequency within the RF frequency band of the radar appliance;

coupling the single-sideband-modulated check signal into at least one of the first and second reception paths;

down-converting the single-sideband-modulated check signals via at least one of the first and second down-converters to produce at least one of:

a first test signal that has been down-converted by the first down-converter; and a second test signal that has been down-converted by the second down-converter; and determining at least one measured variable ($\alpha_1$, $\alpha_2$, $R_1$, $R_2$) using the baseband signals ($S_{B1}$, $S_{B2}$) and one or more of the first and second test signals.

10. The method of claim 9 wherein determining at least one measured variable ($\alpha_1$, $\alpha_2$, $R_1$, $R_2$) comprises using the baseband signals ($S_{B1}$, $S_{B2}$) and both the first and second test signals.

11. The method of claim 9 wherein the local single-sideband-modulated check signal ($S_P$) is produced in the radar appliance and is coupled only into the first reception path.

12. The method of claim 9 wherein the local single-sideband-modulated check signal ($S_P$) is produced in the radar appliance and is coupled only into the second reception path.

13. The method of claim 9 wherein the local single-sideband-modulated check signal ($S_P$) is produced in the radar appliance and is coupled into both the first and second reception paths.

14. The method of claim 9 further comprising providing the baseband signals ($S_{B1}$, $S_{B2}$) to a control device and wherein determining at least one measured variable ($\alpha_1$, $\alpha_2$, $R_1$, $R_2$) comprises determining at least one measured variable ($\alpha_1$, $\alpha_2$, $R_1$, $R_2$), via the control device.

15. The method of claim 9 wherein determining at least one measured variable ($\alpha_1$, $\alpha_2$, $R_1$, $R_2$) using the baseband signals is characterized in that the local single-sideband-modulated check signal is produced in the radar appliance and is coupled into the first reception path and/or into the second reception path, as a result of which the control device receives firstly the check signal that has been down-converted by the first down-converter as a first test signal and secondly the check signal that has been down-converted by the second down-converter as a second test signal.

16. The radar appliance of claim 1 wherein:
the pilot signals are produced at a power level which biases the upconverter; and
said test means is configured to produce a single sideband modulated check signal having an RF frequency which is within a RF frequency band of said at least first and second reception antennas.

17. The apparatus of claim 1 wherein the frequency of the local oscillator signal, the first and second pilot signals and the single-sideband-modulated check signal produced by the upconverter have an RF frequency within the RF frequency band of the transmission signals from the radar appliance.

18. The apparatus of claim 1 wherein the frequency of the single-sideband-modulated check signal produced by the upconverter corresponds to the mean frequency of the transmission signals from the radar appliance.

19. The apparatus of claim 2 wherein said test means comprises a control device which may comprise a microcontroller, a digital signal processor and an oscillator to maintain control over phase and power relationships of the first and second pilot signals such that said control device generates the pilot signals at a power level sufficient so as to bias the upconverter.

20. The apparatus of claim 19 wherein said control device comprises a microcontroller and at least one of a digital signal processor and an oscillator and wherein said control device maintains control over the characteristics of the first and second pilot signals and wherein said control device generates the pilot signals at a power level sufficient so as to bias the upconverter.

21. The radar appliance of claim 8 wherein:
the radar appliance transmits RF signals having a frequency within an RF frequency band and said first and a second reception antennas are operable to receive RF signals within the RF frequency band;
said test means is configured to produce a local single-sideband-modulated check signal having a frequency within the RF frequency band of the at least first and second reception antennas; and
said control device comprises a notch filter configured to reject a signal component having a frequency which corresponds to at least one of the first and second pilot signals.

22. The method of claim 9 wherein the RF frequency corresponds to the mean RF frequency of the RF frequency band of the radar appliance.

23. The method of claim 9 further comprising filtering a signal component having a frequency which corresponds to at least one of the first and second pilot signals which are obtained continually in respective baseband signals during the operation of the radar appliance.

24. The method of claim 23 wherein filtering comprises filtering with a notch filter.

* * * * *